United States Patent
Liquicia et al.

(10) Patent No.: US 8,576,597 B2
(45) Date of Patent: Nov. 5, 2013

(54) COMMUTATOR FOR BRIDGELESS PFC CIRCUIT

(75) Inventors: Marcos Agoo Liquicia, New Taipei (TW); Chien-Ta Liang, New Taipei (TW); Noel Vea Tangonan, New Taipei (TW); Wendel Rodriguez Apuang, New Taipei (TW)

(73) Assignee: Compuware Technology Inc., New Taipei (TW)

( * ) Notice: Subject to any disclaimer, the term of this patent is extended or adjusted under 35 U.S.C. 154(b) by 151 days.

(21) Appl. No.: 13/241,271

(22) Filed: Sep. 23, 2011

(65) Prior Publication Data

US 2013/0077371 A1    Mar. 28, 2013

(51) Int. Cl.
*H02M 7/217* (2006.01)

(52) U.S. Cl.
USPC .............................. 363/127; 363/81; 363/126

(58) Field of Classification Search
USPC ........ 323/207, 222, 223, 225; 363/44, 53, 54, 363/81, 82, 89, 90, 125, 126, 127
See application file for complete search history.

(56) References Cited

U.S. PATENT DOCUMENTS

| | | | |
|---|---|---|---|
| 5,510,972 A * | 4/1996 | Wong | 363/127 |
| 8,085,563 B2 * | 12/2011 | Gaboury et al. | 363/89 |
| 8,385,032 B1 * | 2/2013 | Mao et al. | 361/18 |

* cited by examiner

*Primary Examiner* — Nguyen Tran
(74) *Attorney, Agent, or Firm* — Leong C. Lei

(57) ABSTRACT

The commutator for a bridgeless PFC circuit is characterized in that a synchronous half-wave rectifier is connected between a bridgeless PFC boost circuit and an AC power source and is coupled to the two terminals of the AC power source. The synchronous half-wave rectifier contains a first synchronous transistor, a second synchronous transistor, and a control circuit.

5 Claims, 5 Drawing Sheets

COMMUTATOR FOR BRIDGELESS PFC CIRCUIT

TECHNICAL FIELD OF THE INVENTION

The present invention is generally related to power factor correction circuits for power supplies, and more particularly to a commutator for a bridgeless power factor correction circuit capable of avoiding switching loss and enhancing overall efficiency.

DESCRIPTION OF THE PRIOR ART

As shown in FIGS. 1 and 2, inside the boost circuits of a bridgeless power factor correction (PFC) circuit, a boost transformer contains two inductors and two boost circuits are formed. The boost circuits further contain two MOSFETs and two diodes. For each half cycle of the input AC power, one MOSFET functions as a switch while the other MOSFET functions as a diode. The working MOSFET, a diode, and an inductor jointly form a DC/DC boost converter. The input current is controlled by the boost converters and varies in accordance with the input voltage.

Even though the bridgeless design helps improving the conventional PFC circuit, it still suffers some disadvantages. For example, the MOSFET functioning as a switch causes loss of some degree. Especially for large power applications, the loss would be significant.

SUMMARY OF THE INVENTION

A major objective of the present invention is to reduce switching loss and to enhance the overall efficiency of an AC/DC power supply.

A secondary objective of the present invention is to provide a way of voltage measurement that could be easily implemented. Another objective is to reduce electromagnetic interference (EMI).

To achieve the objectives, a commutator for a bridgeless PFC circuit is provided. The commutator is coupled to the boost circuit of the bridgeless PFC circuit whose output is through a DC/DC converter. The commutator is characterized in that a synchronous half-wave rectifier is connected between the bridgeless PFC boost circuit and an AC power source and is coupled to the two terminals of the AC power source.

The synchronous half-wave rectifier contains a first synchronous transistor, a second synchronous transistor, and a control circuit.

The first synchronous transistor is connected to a terminal of the AC power source via a first signal input terminal. The second synchronous transistor is connected to the other terminal of the AC power source via a second signal input terminal. The control circuit is positioned between the first synchronous transistor and the second synchronous transistor, and is connected to the two terminals of the AC power source via the first synchronous transistor and the second synchronous transistor, respectively.

The control circuit contains a first synchronous circuit, a first protection circuit, a second synchronous circuit, and a second protection circuit. The first protection circuit is electrically connected to the first synchronous transistor. The first synchronous circuit is coupled between the first protection circuit and the second synchronous transistor. The second protection circuit is electrically connected to the second synchronous transistor. The second synchronous circuit is coupled between the second protection circuit and the first synchronous transistor.

The present invention provides a simplified circuit design, an enhanced power utilization, and a reduced carbon footprint. The present invention also utilizes a reduced number of components and therefore is capable of achieving cost reduction and increased yield.

Preferably, the first protection circuit contains a first protection transistor and a first protection diode. The first protection transistor is a BJT.

Preferably, the second protection circuit contains a second protection transistor and a second protection diode. The second protection transistor is a BJT.

Preferably, the first synchronous circuit contains a first bias diode.

Preferably, the second synchronous circuit contains a second bias diode.

Preferably, the first and second synchronous transistors are MOSFETs.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
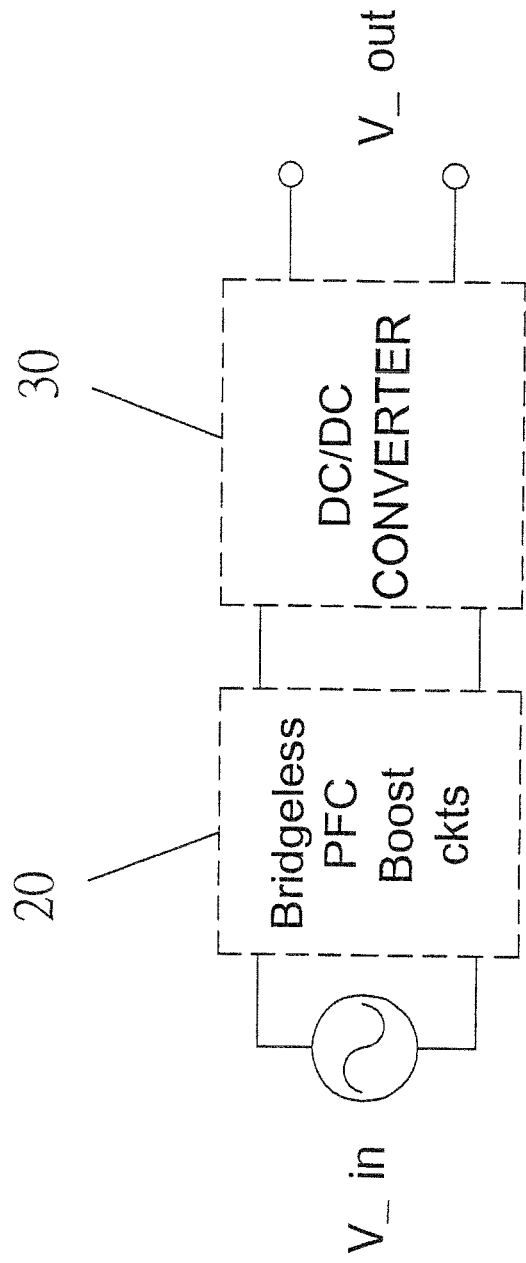
FIG. 1 is a block diagram showing a conventional bridgeless PFC circuit.
Figure 2:
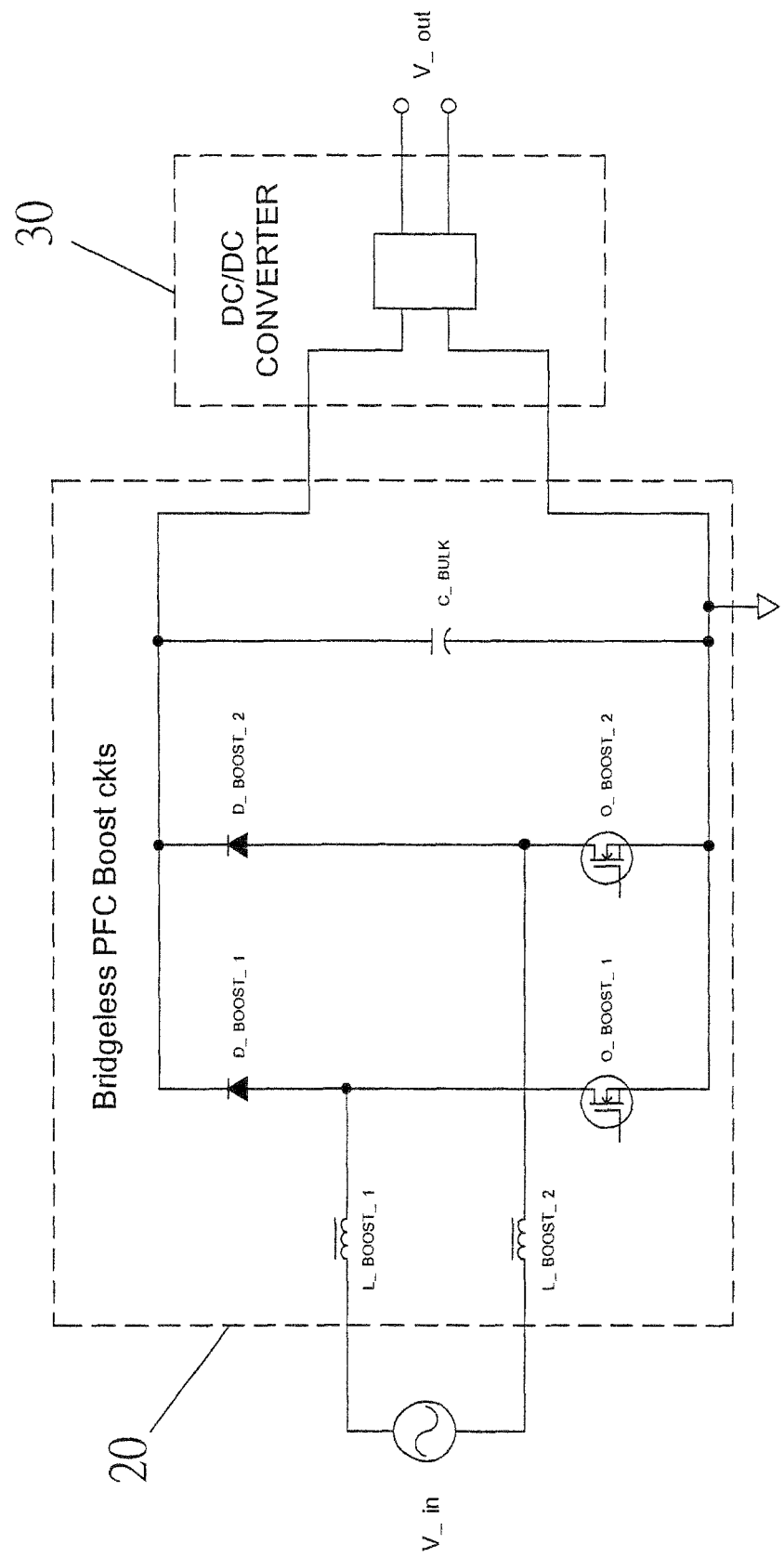
FIG. 2 is a schematic diagram showing the conventional bridgeless PFC circuit of FIG. 1.

As shown in FIGS. 1 and 2, the prior art has already taught that a conventional bridgeless PFC circuit contains bridgeless PFC (power factor correction) boost circuits 20 and a DC/DC converter 30 sequentially and electrically connected between an AC power source and a load.

Figure 3:
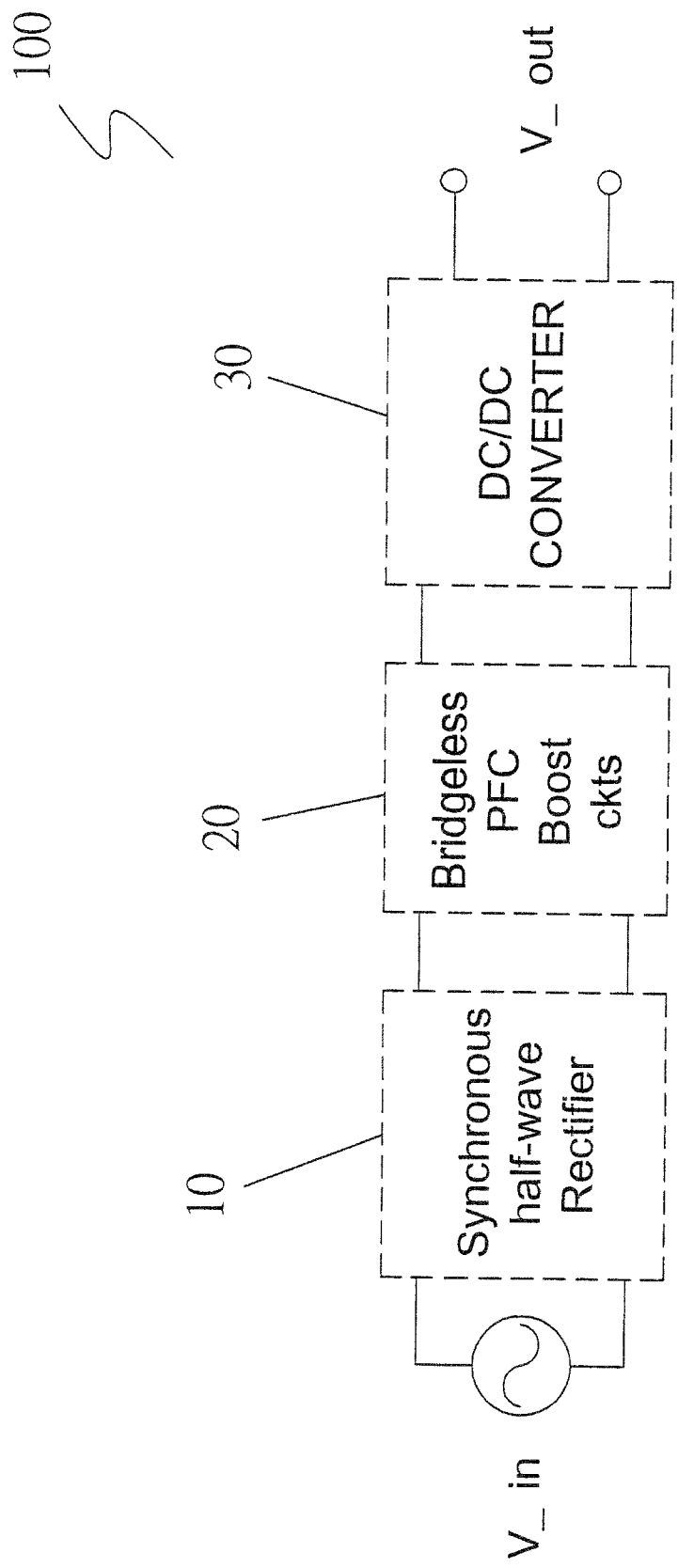
FIG. 3 is a block diagram showing a bridgeless PFC circuit with a commutator according to an embodiment of the present invention.

As shown in FIG. 3, a commutator 100 for a bridgeless PFC circuit according to an embodiment of the present invention is to configure a synchronous half-wave rectifier 10 between the bridgeless PFC boost circuits 20 and the AC power source.

Figure 4:
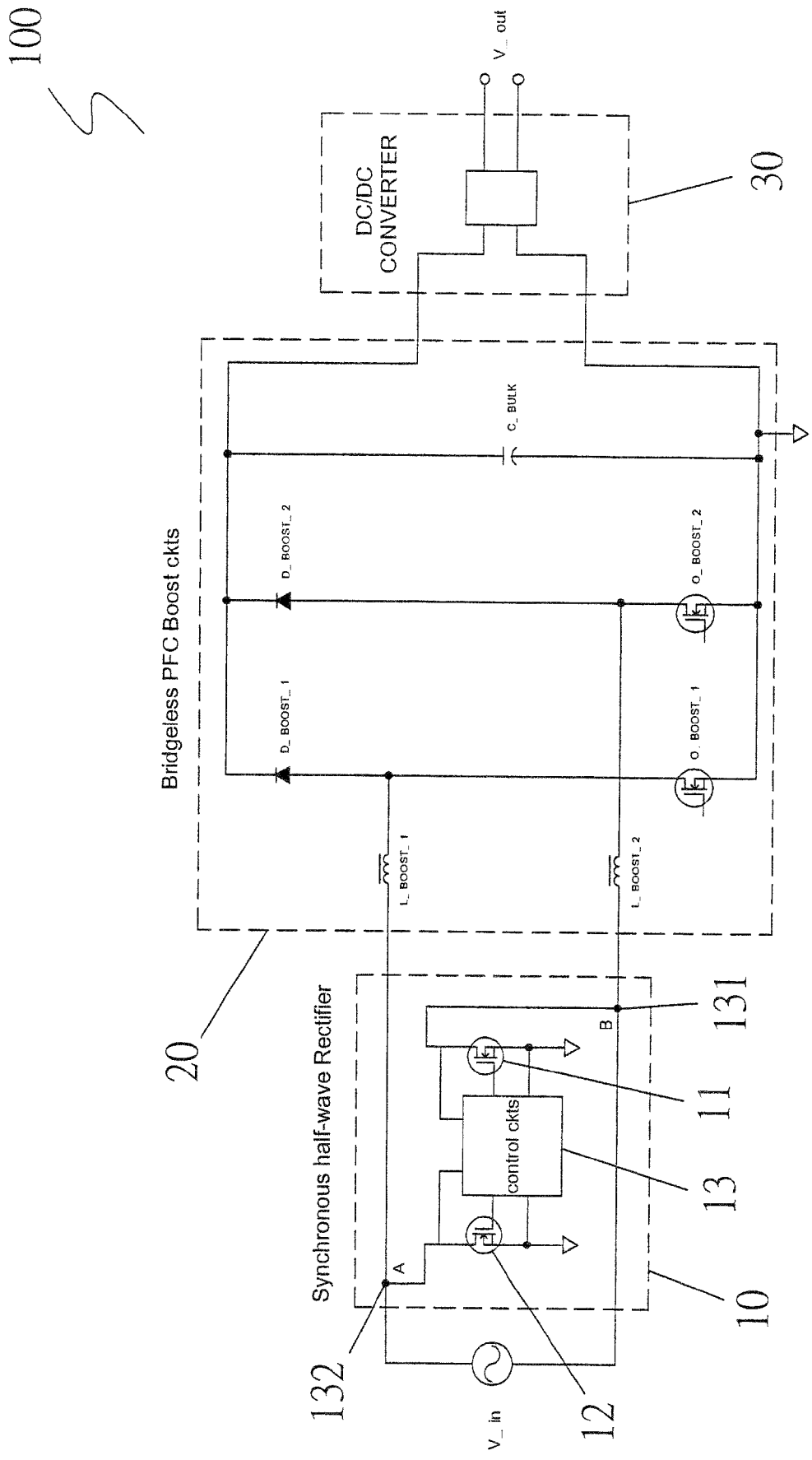
FIG. 4 is a schematic diagram showing a synchronous half-wave rectifier of the commutator of FIG. 3.

As shown in FIG. 4, the synchronous half-wave rectifier 10 contains a first synchronous transistor 11, a second synchronous transistor 12, and a control circuit 13. The first synchronous transistor 11 is connected to a terminal of the AC power source via a first signal input terminal 131. The second synchronous transistor 12 is connected to the other terminal of the AC power source via a second signal input terminal 132. The control circuit 13 is positioned between the first synchronous transistor 11 and the second synchronous transistor 12, and is connected to the two terminals of the AC power source via the first synchronous transistor 11 and the second synchronous transistor 12.

Figure 5:
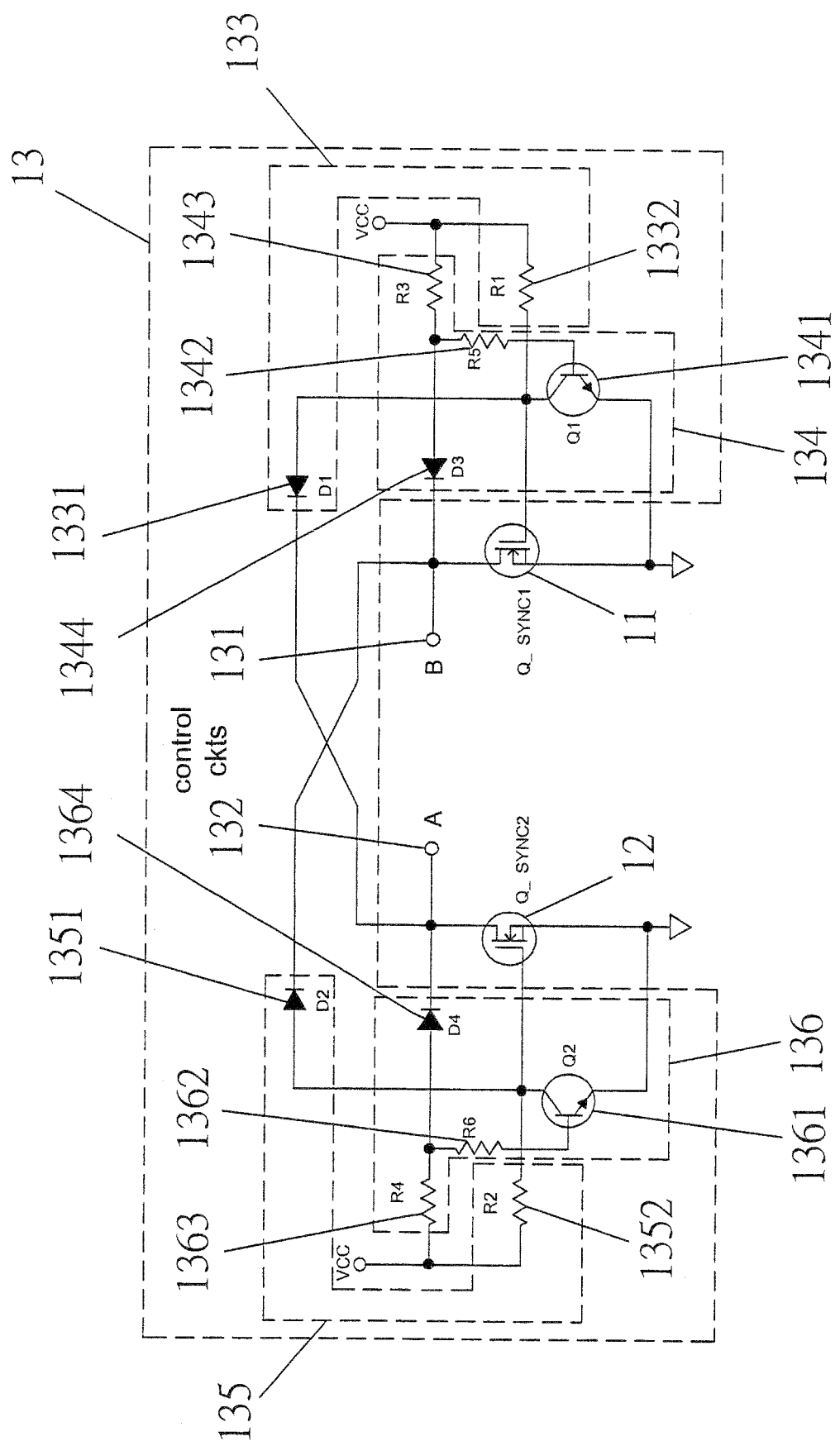
FIG. 5 is a schematic diagram showing a control circuit of the synchronous half-wave rectifier of FIG. 4.

As shown in FIG. 5, the control circuit 13 contains a first synchronous circuit 133, a first protection circuit 134, a second synchronous circuit 135, and a second protection circuit 136. The first protection circuit 134 is electrically connected to the first synchronous transistor 11. The first synchronous circuit 133 is coupled between the first protection circuit 134 and the second synchronous transistor 12. The second protection circuit 136 is electrically connected to the second synchronous transistor 12. The second synchronous circuit 135 is coupled between the second protection circuit 136 and the first synchronous transistor 11.

The present invention operates as follows. When the line voltage is zero, the first and second bias diodes 1331 and 1351 are forward biased by the driving voltage VCC through the first and second bias resistors 1332 and 1352. The gates of the first and second synchronous transistors 11 and 12 are clamped by the corresponding diodes and therefore are turned off.

When the line voltage rises in the positive half cycle and reaches the gate threshold voltage of the first synchronous transistor 11, the first synchronous transistor 11 is turned on. As the line voltage continues to rise above the driving voltage VCC, the first bias diode 1331 is reverse biased. The first synchronous transistor 11 remains turned on during the entire positive half cycle.

During the period that the first synchronous transistor 11 is turned on, the gate of the second synchronous transistor 12 is clamped by the first synchronous transistor 11 through the second bias diode 1351, and the second synchronous transistor 12 is therefore turned off. When the line voltage in the positive half cycle falls toward zero and is below the gate threshold voltage, the first synchronous transistor 11 is automatically turned off by the first bias diode 1331. Until the line voltage starts to reverse, the first and second synchronous transistors 11 and 12 are both turned off.

When the line voltage rises in the negative half cycle, and reaches the gate threshold voltage of the second synchronous transistor 12, the second synchronous transistor 12 is turned on. As the line voltage continues to rise above the driving voltage VCC, the second bias diode 1351 is reverse biased. The second synchronous transistor 12 remains turned on during the entire negative half cycle.

During the period that the second synchronous transistor 12 is turned on, the gate of the first synchronous transistor 11 is clamped by the second synchronous transistor 12 through the first bias diode 1311, and the first synchronous transistor 11 is therefore turned off.

When the line voltage in the negative half cycle rises toward zero and is below the gate threshold voltage, the second synchronous transistor 12 is automatically turned off by the second bias diode 1351. Until the line voltage starts to reverse, the first and second synchronous transistors 11 and 12 are both turned off.

Under normal operation, the current return path is either through the first synchronous transistor 11 or through the second synchronous transistor 12. Normally, the current flows from source to drain. If there is cross-conduction phenomenon, the first and second synchronous transistors 11 and 12 will both be turned on.

If the first and second synchronous transistors 11 and 12 are turned on, the current of either of them is said to be a reversed current if it flows from drain to source.

The protection against the reversed current is by the first and second protection circuits 134 and 136. The reversed current protection for the first synchronous transistor 11 is by a first protection transistor 1341, a first protection diode 1344, a first limiting resistor 1343, and a base resistor 1342. The reversed current protection for the second synchronous transistor 12 is by a second protection transistor 1361, a second protection diode 1364, a second limiting resistor 1363, and a base resistor 1362. If cross-conduction happens during the positive half cycle, there is a reversed current from the second synchronous transistor 12's drain to source. If cross-conduction happens during the negative half cycle, there is a reversed current from the first synchronous transistor 11's drain to source.

The protection against cross-conduction is achieved as follows. When there is a reversed current in the first synchronous transistor 11; the voltage from drain to source is positive relative to ground, and this voltage is added to the forward bias of the first protection diode 1344, thereby activating the first protection transistor 1341. At the time the first protection transistor 1341 is turned on, the first synchronous transistor 11 is automatically turned off. When there is a reversed current in the second synchronous transistor 12, the voltage from drain to source is positive relative to ground, and this voltage is added to the forward bias of the second protection diode 1364, thereby activating the second protection transistor 1361. At the time the second protection transistor 1361 is turned on, the second synchronous transistor 12 is automatically turned off.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A commutator for a bridgeless PFC circuit coupled bridgeless PFC boost circuits whose output is through a DC/DC converter, said commutator characterized in having a synchronous half-wave rectifier connected between said bridgeless PFC boost circuit and an AC power source and connected to the two terminals of said AC power source, said synchronous half-wave rectifier comprising:

a first synchronous transistor connected to a terminal of said AC power source via a first signal input terminal;

a second synchronous transistor connected to the other terminal of said AC power source via a second signal input terminal; and a control circuit connected between said first synchronous transistor and said second synchronous transistor, and connected to the two terminals of said AC power source via said first synchronous transistor and said second synchronous transistor, respectively; wherein said control circuit comprises a first synchronous circuit, a first protection circuit, a second synchronous circuit, and a second protection circuit;

said first protection circuit is connected to said first synchronous transistor; said first synchronous circuit is connected between said first protection circuit and said second synchronous transistor; said second protection circuit is connected to said second synchronous transistor; and said second synchronous circuit is connected between said second protection circuit and said first synchronous transistor;

said first protection circuit comprises a first protection transistor and a first protection diode;

said second protection circuit comprises a second protection transistor and a second protection diode;

said first synchronous circuit comprises a first bias diode connected to said second synchronous transistor; and said second synchronous circuit comprises a second bias diode connected to the second synchronous transistor.

2. The commutator for a bridgeless PFC circuit according to claim 1, wherein said first synchronous transistor is a MOSFET.

3. The commutator for a bridgeless PFC circuit according to claim 1, wherein said second synchronous transistor is a MOSFET.

4. The commutator for a bridgeless PFC circuit according to claim 1, wherein said first protection transistor is a BJT.

5. The commutator for a bridgeless PFC circuit according to claim 1, wherein said second protection transistor is a BJT.

* * * * *